(12) United States Patent
Cha et al.

(10) Patent No.: US 11,902,466 B2
(45) Date of Patent: Feb. 13, 2024

(54) CAPTIONED TELEPHONE SERVICE SYSTEM HAVING TEXT-TO-SPEECH AND ANSWER ASSISTANCE FUNCTIONS

(71) Applicant: Mezmo Corporation, Buena Park, CA (US)

(72) Inventors: Wonjae Cha, Irvine, CA (US); John H Lee, Irvine, CA (US)

(73) Assignee: Mezmo Corporation, Buena Park, CA (US)

( * ) Notice: Subject to any disclaimer, the term of this patent is extended or adjusted under 35 U.S.C. 154(b) by 157 days.

(21) Appl. No.: 17/585,347

(22) Filed: Jan. 26, 2022

(65) Prior Publication Data

US 2023/0239401 A1 Jul. 27, 2023

(51) Int. Cl.
*H04M 3/493* (2006.01)
*G06F 3/0482* (2013.01)
*G06F 40/263* (2020.01)
*G10L 13/00* (2006.01)

(52) U.S. Cl.
CPC .......... *H04M 3/493* (2013.01); *G06F 3/0482* (2013.01); *G06F 40/263* (2020.01); *G10L 13/00* (2013.01)

(58) Field of Classification Search
CPC ............. H04M 3/493; H04M 3/42382; H04M 3/42391; H04M 7/0042; H04M 7/0045; G06F 3/0482; G06F 40/263; G10L 13/00; G10L 15/26
See application file for complete search history.

(56) References Cited

U.S. PATENT DOCUMENTS

| | | | | |
|---|---|---|---|---|
| 9,374,536 | B1* | 6/2016 | Nola | H04N 7/141 |
| 9,571,638 | B1* | 2/2017 | Knighton | G10L 15/26 |
| 9,622,052 | B1* | 4/2017 | Pan | G10L 15/30 |
| 9,917,939 | B1* | 3/2018 | Stimpson | H04M 3/42391 |
| 2007/0106724 | A1* | 5/2007 | Gorti | H04L 65/1101 |
| | | | | 709/204 |
| 2007/0143103 | A1* | 6/2007 | Asthana | H04M 3/567 |
| | | | | 704/200 |
| 2013/0058270 | A1* | 3/2013 | Cha | H04M 3/42391 |
| | | | | 370/315 |
| 2015/0011251 | A1* | 1/2015 | Parker | H04M 3/42382 |
| | | | | 455/466 |

(Continued)

*Primary Examiner* — Akelaw Teshale
(74) *Attorney, Agent, or Firm* — Heedong Chae; Lucem, PC

(57) ABSTRACT

A captioned telephone service system having the text-to-speech and answer assistance functions includes a captioner, a text-to-speech system, and an answer assistance system. The captioner provides captions to a user during a phone call between the user and a peer by receiving the peer's voice from a peer device, transcribing the peer's voice into caption data, and transferring the caption data to the user device. The text-to-speech system is configured to receive text data from the user device, convert the text data into speech, and transfer the voice of the speech to the peer device via the voice path in real time. The answer assistance system is configured to receive the caption data from the captioner, analyze the caption data to identify a question, analyze the question to generate answer suggestions, and forward the answer suggestions to the user device for review, editing, and selection.

19 Claims, 4 Drawing Sheets

(56) References Cited

U.S. PATENT DOCUMENTS

| | | | |
|---|---|---|---|
| 2016/0203818 A1* | 7/2016 | Cha | G10L 15/26 |
| | | | 704/235 |
| 2017/0206914 A1* | 7/2017 | Engelke | H04M 1/2475 |
| 2017/0331952 A1* | 11/2017 | Rogers | H04W 4/02 |
| 2018/0096687 A1* | 4/2018 | Cook | G10L 15/01 |
| 2018/0270350 A1* | 9/2018 | Engelke | G10L 15/01 |
| 2019/0037072 A1* | 1/2019 | Engelke | H04M 1/2475 |
| 2019/0312973 A1* | 10/2019 | Engelke | G10L 15/183 |
| 2020/0267259 A1* | 8/2020 | Behm | H04M 1/72475 |
| 2021/0250441 A1* | 8/2021 | Gray | H04M 3/42382 |
| 2022/0020388 A1* | 1/2022 | Trim | G10L 25/84 |
| 2022/0103683 A1* | 3/2022 | Engelke | H04M 3/42391 |
| 2022/0124193 A1* | 4/2022 | Montero | H04M 1/72478 |
| 2023/0096543 A1* | 3/2023 | Moy | G10L 15/22 |
| | | | 704/3 |

* cited by examiner

10

Thank you for calling Personal Healthcare center.
For security, you need to answer for some questions.
How old are you?

I'm twenty years old

CAPTIONED TELEPHONE SERVICE SYSTEM HAVING TEXT-TO-SPEECH AND ANSWER ASSISTANCE FUNCTIONS

FIELD OF THE INVENTION

The present invention relates to a captioned telephone service ("CTS") system for providing captions to a CTS user during a phone call between the CTS user and a peer where the captions are transcribed from the peer's voice. In particular, the invention relates to a CTS system having text-to-speech ("TTS") and answer assistance functions. The CTS system's TTS system converts the CTS user's text input into speech, and transfers the voice of the speech to the peer's device in real time via the voice path. The CTS system's answer assistance system analyzes the peer's voice to identify a question, analyzes the question to generate answer suggestions, and sends the answer suggestions to the CTS user device to be displayed for the CTS user's editing and/or selection.

BACKGROUND OF THE INVENTION

A captioned telephone service, also known as CTS, is used to help a person, typically one who is deaf or hard of hearing but can speak, to make phone calls. A CTS system allows a person who is deaf or hard of hearing (the CTS user) to have a phone call with another person (a peer) who may or may not be deaf or hard of hearing such that the CTS system receives the peer's voice, transcribes it into caption data, and sends the caption data to the CTS user's device to be displayed as text. Accordingly, using the CTS system, the CTS user can speak to the peer and simultaneously listen to the peer and read the captions of what the peer says. Such transcription is usually made by a human call agent, automatic speech recognition, or both.

A CTS user's hearing loss can either be congenital or acquired. Congenital hearing loss is hearing loss which is present at birth, or occurs very soon after birth, whereas acquired hearing loss is hearing loss which appears after birth at certain time in his life, perhaps resulting from an illness or injury. A CTS user with hearing loss, especially congenital hearing loss, may have difficulty with making speech sounds, and his speech may be difficult to understand. In such cases, even if the CTS user uses the CTS system, the peer may have difficulty understanding the CTS user's speech, which can likely make the phone call last longer.

Further, a CTS user whose speech is difficult to understand may have difficulty in a phone call utilizing interactive voice response ("IVR"). IVR is an automated phone system technology that allows humans to interact with a computer operated phone system through speech recognition or keypad selection. If the CTS user's speech is hard to understand, the CTS user's response may not be properly recognized and processed and the phone may last longer if the automated phone system has to repeat the same question, request, or comment. Furthermore, if the phone call using IVR has a timeout, the CTS user may not respond within the time limit and the phone call may be terminated or last longer than normal due to repeated communications.

Accordingly, the CTS system needs to have functions to help the CTS user, whose speech may be difficult to understand, to be better understood by the peer and allow the CTS user to correctly and quickly respond to questions during a phone call utilizing IVR.

To solve the above problems, a CTS system having TTS and answer assistance functions for accurate and timely communication is provided, as there is a need for a CTS system that receives and converts the CTS user's text input into speech to be played to the peer, and identifies the peer's question, and presents an answer to the question to the CTS user for a quick selection and reply. This invention is directed to solve these problems and satisfy the long-felt need.

SUMMARY OF THE INVENTION

The present invention contrives to solve the disadvantages of the prior art. The present invention provides a CTS system having TTS and answer assistance functions for accurate and timely communication.

One object of the invention is to provide a CTS system which includes a captioner, a TTS system, and an answer assistance system. The captioner provides captions to a CTS user during a phone call between the CTS user and a peer where the captioner receives the peer's voice from a peer device, transcribes the peer's voice into caption data, and transfers the caption data to the CTS user device. The TTS system is configured to receive text data from the CTS user device, convert the text data into speech, and transfers the voice of the speech to the peer device via the voice path. In addition, the answer assistance system is configured to receive the caption data from the captioner, analyze the caption data to identify a question, analyze the question to generate answer suggestions, and forward the answer suggestions to the CTS user device for review, editing, and selection.

Another object of the invention is to provide a system which includes a CTS system and a CTS user device where the CTS system has a captioner and a TTS system, and the CTS user device has an answer assistance system. In this embodiment, the answer assistance system is installed in the CTS user device, instead of the CTS system, and thus, this embodiment provides better protection and security of personal information because the CTS user's personal information stored in the CTS user device does not have to be transmitted out of the CTS user device for being analyzed by the answer assistance system.

Still another object of the invention is to provide a system which includes a CTS system, a TTS system, and a CTS user device, and further includes an answer assistance system. In this embodiment, the TTS system and the answer assistance system are not elements of the CTS system, but instead, they are elements separate to the CTS system and connected to the CTS system—more particularly, a voice handler and a captioner of the CTS system respectively.

The advantages of the present invention are: (1) the CTS system of the present invention enables a CTS user, whose speech is difficult to understand, to have accurate, effective and timely communication with a peer by providing TTS and answer assistance functions; (2) the TTS function of the CTS system according to the present invention allows a CTS user who cannot speak to make a phone call with a peer; (3) the system or the CTS system of the present invention receives the CTS user's text input, converts it into speech, and then transfers the voice of the speech to the peer device via the voice path in real time, and thus, a CTS user, who cannot speak or whose speech is difficult to understand, can have an accurate and timely phone call with a peer; (4) a CTS user of the present invention can have an accurate, effective, and timely communication in a phone call using IVR due to the TTS and answer assistance functions, and thus, the CTS user does not have to ask someone else and disclose his personal information to help him for such a phone call; (5) during a phone call using IVR, a CTS user can timely answer a question using the answer assistance function of the present invention; (6) during a phone call using IVR, a CTS user can avoid unintended call termination or repeating a question or answer resulting from a timeout because the CTS user can timely understand and answer a question using the call assistance function of the present invention; (7) personal information of the CTS user is better protected and secured in the embodiment where the answer assistance system is installed in the CTS user device; (8) the user interface of the CTS user device according to the present invention is intuitive and easy to use; (9) animating the text data or displaying a speech progress bar helps the CTS user check the progress of the speech converted from the text data so that the CTS user can smoothly communicate with the peer; (10) the CTS user's previous answer to a question is transmitted and saved in the answer assistance system to be analyzed and used in a same, similar, or related question in the future; (11) the CTS system of the present invention is configured to identify the spoken language of the CTS user and notify the answer assistance system of the spoken language to save processing time; (12) the TTS system of the present invention receives and analyzes sample(s) of a CTS user's voice to select a voice for playing the speech which is closest to the CTS user's voice; (13) the TTS system of the present invention receives and analyzes samples of a CTS user's voice to customize the selected voice for playing the speech to make it sound even more similar to the CTS user's voice; (14) the TTS system of the present invention measures the speed of the CTS user's speech and plays the speech at a speed similar to the speed of the CTS user's speech; and (15) the TTS system of the present invention is configured to play the speech in a voice and speed similar to those of the CTS user, and thus confusion by the peer, resulting from quite different voices of the speech and the CTS user, can be reduced and minimized.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
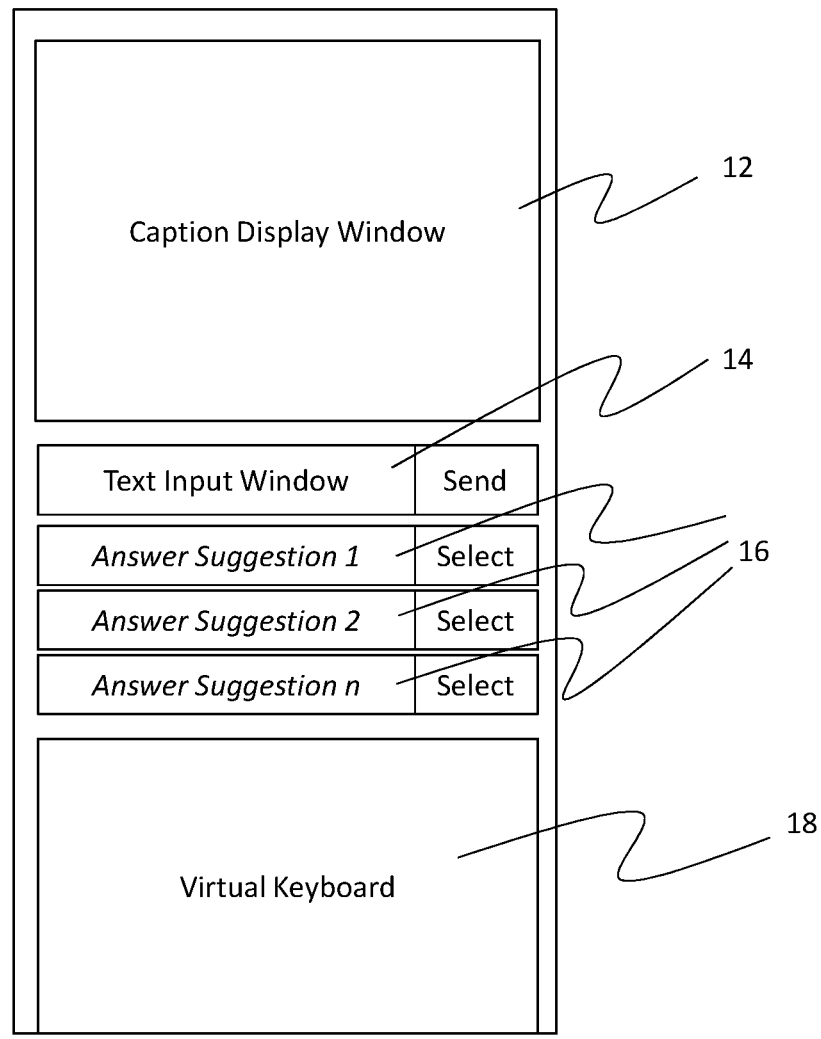
FIG. 1 shows a user interface of a CTS user device according to the present invention, showing a chat window, text input field, and answer suggestion display field.
Figure 2:
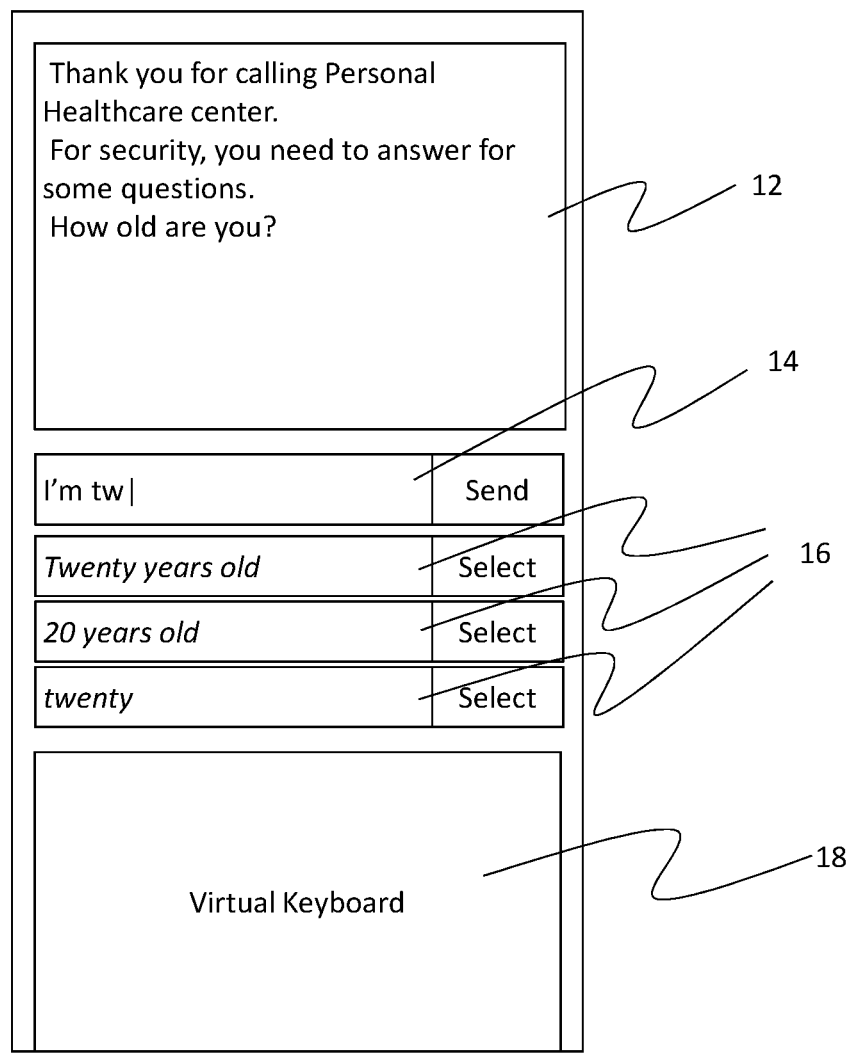
FIG. 2 shows another view of the user interface of the CTS user device according to the present invention, showing sample communication displayed in the chat window and answer suggestions displayed in the text input field.
Figure 3:
FIG. 3 shows still another view of the user interface of the CTS user device according to the present invention, showing animated text data.
Figure 4:
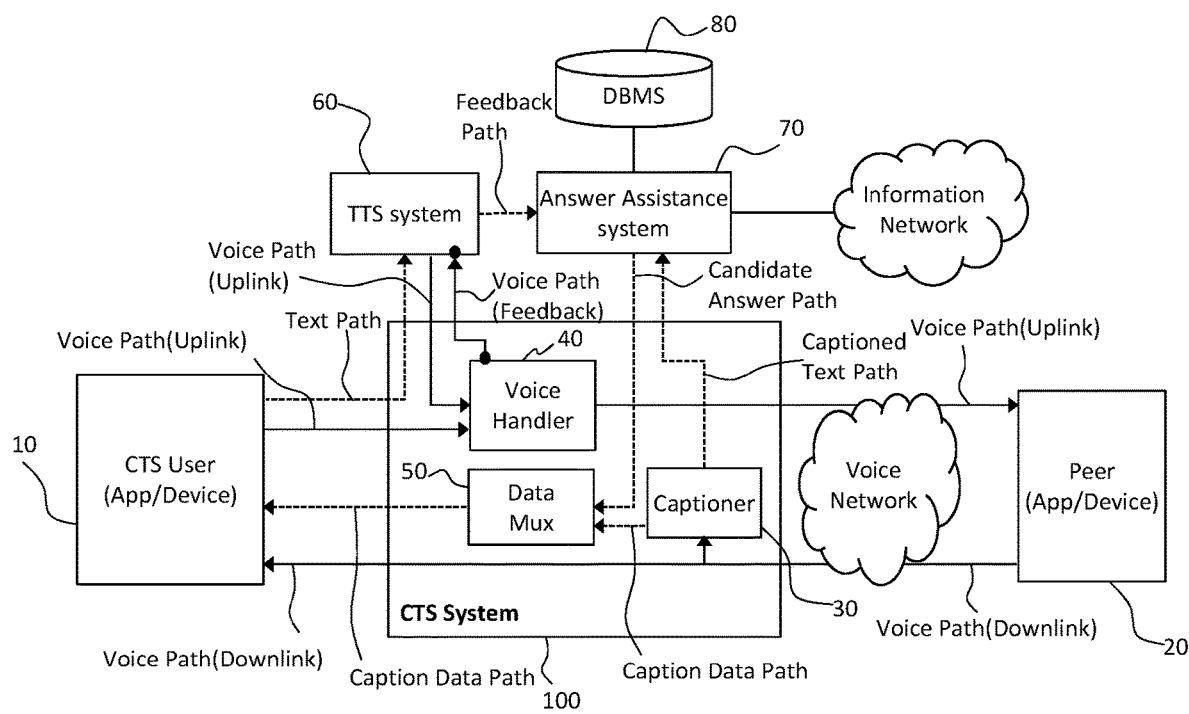
FIG. 4 shows a schematic diagram of the system according to one embodiment of the present invention.

FIGS. 1-3 show the user interface of the CTS user device 10, and FIG. 4 shows a schematic diagram of the system according to the present invention.

The CTS system 100 of the present invention includes a captioner 30, a TTS system 60, and an answer assistance system 70. The captioner 30 provides captions to a CTS user during a phone call between the CTS user and a peer by receiving the peer's voice from a peer device 20, transcribing the peer's voice into a caption data, and transferring the caption data to the CTS user device 10. As shown in FIG. 4, a voice path is established between the captioner 30 and the peer device 20 for the captioner 30 to receive the peer's voice from the peer device 20, and a data path is established between the captioner and the CTS user device 10 for the captioner 30 to send the caption data to the CTS user device 10. Preferably, the CTS system 100 relays the peer's voice to the CTS user device 10 and copies and sends it to the captioner 30.

The CTS user device 10 may be a mobile phone, smart phone, captioned telephone, terminal, or any other device which can make phone calls and has a screen to display a real-time caption data, and the CTS user device 10 may further include the CTS user application installed on the CTS user device 10. The peer device 20 may be a telephone, mobile phone, smart phone, tablet computer, or any other device which can make phone calls, and the peer device 20 may or may not include the peer application installed on the peer device 20.

The TTS system 60 utilizes speech synthesis which converts text into speech in a computer-generated simulation of human speech. The TTS system 60 is configured to receive a text data from the CTS user device 10, convert the text data into a speech, and transfer a voice of the speech to the peer device 20. The TTS system 60 converts the text data in the form of normal language text into the speech in a human-sounding voice which the peer can understand. The speech may be generated as an audio file and then, played and transferred via a voice path to the peer device 20 in real time. Alternatively, the speech may be generated as a human-sounding voice and transferred via the voice path to the peer device 20 in real time.

As shown in FIG. 4, a data path is established between the CTS user device 10 and the TTS system 60 so that the TTS system can receive the text data from the CTS user device 10. Voice paths are established between the TTS system 60 and the voice handler 40 and between the voice handler 40 and the peer device so that the TTS system 60 transfers the voice of the speech to the peer device 20 through the voice handler 40 via the voice paths. In addition, a voice path is established between the CTS user device 10 and the voice handler 40 so that the CTS user's voice or speech can be transferred to the peer device 20 through the voice handler 40 via the voice paths.

The answer assistance system 70 is configured to receive the caption data from the captioner 30, analyze the caption data to identify a question, analyze the question to generate answer suggestions, and forward the answer suggestions to the CTS user device 10. Here, the answer suggestions include one answer suggestion as well even if it is written in a plural form. In order to identify a question, the answer assistance system 70 may have database which stores and updates frequently or previously used questions and terms such as name, age, date of birth, address, identification number, etc. The answer assistance system 70 may identify sentences from the caption data and analyze and compare each sentence to the database. The answer assistance system 70 may further analyze each sentence to see whether the sentence contains a question mark "?" or question indicators such as who, what, where, when, why and how. Furthermore, the answer assistance system 70 may have database which stores and updates answers to the frequently used questions.

The answer assistance system 70 is connected to the captioner 30 via the data path so that the captioner 30 can transfer the caption data to the answer assistance system 70. Furthermore, the CTS system 100 further includes a data multiplexing ("data mux") 50 which is connected to the answer assistance system 70 via the data path and the CTS user device via the data path in order to transmit the answer suggestions from the answer assistance system 70 to the data mux 60 and then to the CTS user device via the data paths. Preferably, the data mux 50 is connected to the captioner 30 via the data path such that the caption data is transferred from the captioner 30 to the data mux 50, and then to the CTS user device 10 via the data paths.

As in FIG. 4, the CTS system 100 is connected to the CTS user device 10 and the peer device 20. The voice handler 40 of the CTS system 100 is connected to the CTS user device 10 via the voice path such that the CTS user's voice is transferred from the CTS user device 10 to the voice handler 40, and then, the CTS user's voice is transferred from the voice handler 40 to the peer device 20 via the voice path. In addition, the captioner 30 is connected to the peer device 20 via the voice path such that the peer's voice is transferred from the peer device 20 to the captioner 30 via the voice path. Further, the peer's voice is transferred from the peer device 20 to the CTS user device 10 via the voice path which connects the peer device 20 to the CTS user device 10. As explained above, the data mux 50 is connected to the CTS user device 10 via the data path.

The CTS system 100 further includes a voice handler 40 which is connected to the TTS system 60 via the voice path, the CTS user device 10 via the voice path, and the peer device 20 via the voice path. The TTS system 60 generates and plays the speech which is transferred to the voice handler 40 via the voice path, and the voice handler 40 transfers the speech, which is played by the TTS system 60, to the peer device 20 via the voice path.

As in FIG. 1, the CTS user device 10 includes a user interface which has a chat window (or caption display window) 12, a text input field (or text input window) 14, an answer suggestion display field 16, and optionally a virtual keyboard 18. The chat window 12 includes a caption display window 12 which is configured to display the caption data. The chat window 12 may only display the caption data or may further display the text data typed and entered by the CTS user. Preferably, when the chat window 12 display both of the caption data and text data, the caption data is left aligned and the text data is right aligned, and the caption data and text data may be displayed in different font or color, or against different color background, or in any other means to visually differentiate between the two.

The text input field (or text input window) 14 is configured to display the text data which the CTS user types, and the answer suggestion display field 16 is configured to display the answer suggestions. The text input field 14 may have a "send" button, and the CTS user device 10 sends the text data to the TTS system 60 when the CTS user touches or presses the "send" button or "enter" button on the virtual keyboard 18.

The answer suggestion display field 16 is configured for the CTS user to select an answer from the answer suggestions. The answer suggestion display field 16 may have "select" button(s) right next to the answer suggestions as in FIGS. 1 and 2, and the CTS user can touch or press the "select" button to select an answer suggestion. Alternatively, the CTS user may directly touch or press one of the answer suggestions to select an answer suggestion. Once an answer is selected, the CTS user device 10 may send the answer to the TTS system 60 or display the answer in the text input field 14 so that the CTS user can edit the answer and send the edited answer to the TTS system 60 by touching or pressing the "send" button" or "enter" button on the virtual keyboard 18. After the answer or edited answer is sent to the TTS system 60, it is converted into a speech which is played and transferred to the peer device 20. Once an answer is selected, the answer suggestions disappear from the answer suggestion display field 16. Alternatively, the CTS user may directly type an answer in the text input field 14 and send it to the TTS system 60, and then, the answer suggestions may disappear from the answer suggestion display field 16. Still alternatively, the CTS user may answer the question verbally and the verbal answer may be transmitted to the voice handler 40 via the voice path, and then, the voice handler 40 may transfer the verbal answer to the peer device 20 via the voice path. Then, the answer suggestions may disappear after a predetermined time or be replaced with next answer suggestions to the next question.

When the CTS user device 10 sends an answer, edited answer, or typed answer to the TTS system 60, the CTS user device 10 may send the answer to the answer assistance system 70 as well either directly or through the TTS system 60 for future analysis. Accordingly, a feedback path may be established between the TTS system 60 and the answer assistance system 70 as in FIG. 4, or between the CTS user device 10 and the answer assistance system 70. The answer assistance system 70 saves the answer and related question together so that the answer can be used for the same, similar or related question in the future.

The TTS system 60 is configured to check a progress of the speech and send the progress of the speech to the CTS user device 10, and the CTS user device 10 is configured to display the progress of the speech by animating the text data or displaying a speech progress bar. The text data may be displayed on the chat window 12 or the text input field 14, and the text data may be animated in gradually changing the color, font, style, or size of the letters of the text data to show the current point in time of playing the speech. A separate speech progress bar may be displayed next to the text data, showing current point in time of playing the speech, and it may display total play time and/or current playing point in time, or 100% and current percentage playing point in time.

The answer assistance system 70 is configured to analyze the CTS user's previous answers, contacts, email, text, internet searches, and social network accounts in order to generate the answer suggestions. This information may be collected from the CTS user device or any other means or channels, and may be saved in a database management system ("DBMS") which is connected to the answer assistance system 70.

The CTS system 100 is configured to identify spoken language of the CTS user by analyzing the CTS user's voice or text data. Once spoken language is identified, the TTS system 60 and the answer assistance system 70 are set to the identified spoken language for faster processing, and the virtual keyboard may be set to the language as well.

Preferably, the TTS system 60 may utilize selecting a voice out of many voices for the speech, or customizing a voice for the speech, or both. The TTS system 60 may include a plurality of voices to generate or play the voice of the speech. The TTS system 60 is configured to receive an audio sample of the CTS user from the CTS user device 10, compare the audio sample to the plurality of the voices, and find a voice closest to the audio sample so that the voice can be used to generate or play the speech. The TTS system 60 may further be configured to receive a plurality of audio samples of the CTS user from the CTS user device 10 and analyze them to customize the voice for making the voice even closer to a voice of the CTS user. To receive the audio sample of the CTS user, the TTS system 60 is connected to the voice handler 40 via an additional voice path (feedback) as in FIG. 4. By providing the audio samples as training data, the TTS system 60 can repeatedly modify the voice of the speech closer and closer to the CTS user's voice. Further, the TTS system 60 may be configured to analyze the speed of the CTS user's speech and adjust the speed of the speech similar to the speed of the CTS user's speech. By emulating the CTS user's speech, the TTS system can produce the speech which sounds similar to the CTS user's own speech, and confusion by the peer, resulting from different voices between the voice of the speech and the CTS user's voice, can be reduced and minimized.

In the alternative embodiment, the system of the present invention may include a CTS system 100 and a CTS user device 10 where the CTS system 100 has a captioner 30 and a TTS system 60 and the CTS user device 10 has an answer assistance system 70. In this embodiment, the answer assistance system 70 is installed in the CTS user device 10, instead of the CTS system 100, and thus, this embodiment provides better protection and security of personal information because the CTS user's personal information stored in the CTS user device 10 does not have to be transmitted out of the CTS user device 10 for being analyzed by the answer assistance system 70. If the answer assistance system 70 only handles typical questions and answers, it can be installed on the CTS user device 10.

The captioner 30 receives the peer's voice from a peer device 20, transcribes the peer's voice into a caption data, and transfers the caption data to a CTS user device 10. The TTS system 60 is configured to receive a text data from the CTS user device 10, convert the text data into a speech, and, transfer the voice of the speech to the peer device 20 via the voice path. The answer assistance system 70 is configured to receive the caption data from the captioner 30, analyze the caption data to identify a question, analyze the question to generate answer suggestions, and forward the answer suggestions to the CTS user device 10. The CTS system 100 is connected to the CTS user device 10 and the peer device 20. The CTS user device 10 is connected to the TTS system 60 via the data path, the voice handler via the voice path, the data mux 50 via the data path, and the captioner via the voice path. The peer device 20 is connected to voice handler 40 via the voice path and the captioner 30 via the voice path.

The CTS system 100 may further include a voice handler 40 and a data mux 50. The voice handler 40 is connected to the TTS system 60 via a voice path, the CTS user device 10 via the voice path, and the peer device 20 via the voice path. The TTS system transfers the voice of the speech to the voice handler 40 via the voice path, and the voice handler 40 transfers the voice of the speech to the peer device 20 via the voice path. The data mux 50 is connected to the answer assistance system 70 via the data path and the CTS user device 10 via the data path in order to transmit the answer suggestions from the answer assistance system 70 to the data mux 60 and then to the CTS user device via the data paths. Preferably, the data mux 50 is connected to the captioner 30 via the data path such that the caption data is transferred from the captioner 30 to the data mux 50, and then to the CTS user device 10 via the data paths.

As in the embodiment explained above, the CTS user device in the alternative embodiment includes a user interface which includes a chat window 12, a text input field 14, an answer suggestion display field 16, and optionally a virtual keyboard 18. The chat window 12 is configured to display the caption data, and the text input field 14 is configured to display the text data which the CTS user types. The answer suggestion display field 16 is configured to display the answer suggestions.

The answer suggestion display field 16 is configured for the CTS user to select an answer from the answer suggestions, and the CTS user device 10 is configured either to send the answer to the TTS system 60 for being converted into a speech, whose voice is transferred to the peer device 20, or to display the answer in the text input field 14 so that the CTS user can edit the answer and send the edited answer to the TTS system 60 for being converted into a speech whose voice is transferred to the peer device 20.

When the CTS user device 10 sends the answer to the TTS system 60, the CTS user device 10 may send the answer to the answer assistance system 70 as well either directly or through the TTS system 60 for future analysis. Accordingly, a feedback path may be established between the TTS system 60 and the answer assistance system 70, or between the CTS user device 10 and the answer assistance system 70. The answer assistance system 70 saves the answer and related question together so that the answer can be used for the same, similar or related question in the future.

In still alternative embodiment, the system of the present invention includes a CTS system 100, a TTS system 60, and a CTS user device 10, and further includes an answer assistance system 70. In this embodiment, the TTS system 60 and the answer assistance system 70 are not elements of the CTS system 100 as shown in FIG. 4, but they are connected to the CTS system 100, more particularly, the voice handler 40 and the captioner 30 of the CTS system 100 respectively (the answer assistance system 70 is further connected to the data mux 50).

The captioner 30 is configured to receive the peer's voice from a peer device 20, transcribe the peer's voice into a caption data, and transfer the caption data to a CTS user device 10. The voice handler 40 is connected to the CTS user device 10 via a voice path and the peer device 20 via the voice path, and the voice handler 40 receives a voice of the CTS user via the voice path and transfers the voice of the CTS user to the peer device 20 via the voice path.

The TTS system 60 is configured to receive a text data from the CTS user device 10, convert the text data into a speech, and play the speech to be transferred to the peer device 20, and the TTS system 60 is connected to the voice handler 40 via the voice path and receives the text data from the CTS user device 10 via a data path. The TTS system 60 transfers the speech to the voice handler 40 via the voice path and the voice handler 40 transfers the speech to the peer device 20 via the voice path. In addition, the answer assistance system 70 is configured to receive the caption data from the captioner 30, analyze the caption data to identify a question, analyze the question to generate answer suggestions, and forward the answer suggestions to the CTS user device 10.

The CTS user device 10 includes a user interface which includes a chat window 12, a text input field 14, an answer suggestion display field 16, and a virtual keyboard 18. The chat window 12 is configured to display the caption data and/or the text data which the CTS user enters. The text input field 14 is configured to display the text data which the CTS user types, and the answer suggestion display field 16 is configured to display the answer suggestions.

The answer suggestion display field 16 is configured for the CTS user to select an answer from the answer suggestions. The CTS user device 10 is configured either to send the answer to the TTS system 60 for being converted into a speech, which is played to be transferred to the peer device 20, or to display the answer in the text input field 14 so that the CTS user can edit the answer and send the edited answer to the TTS system 60 for being converted into a speech which is played to be transferred to the peer device 20.

The answer assistance system 70 is configured to analyze the CTS user's previous answers, contacts, email, text, internet search, and social network account in order to generate the answer suggestions. This information may be collected from the CTS user device or any other means or channels, and may be saved in the DBMS which is connected to the answer assistance system 70 as shown in FIG. 4.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A captioned telephone service ("CTS") system for providing captions to a CTS user during a phone call between the CTS user and a peer, comprising:
   a captioner which receives the peer's voice from a peer device, transcribes the peer's voice into a caption data, and transfers the caption data to a CTS user device;
   a text-to-speech (TTS) system which is configured to receive a text data from the CTS user device, convert the text data into a speech, and transfer a voice of the speech to the peer device; and
   an answer assistance system which is configured to receive the caption data from the captioner, analyze the caption data identify a question, analyze the question to generate answer suggestions, and forward the answer suggestions to the CTS user device,
wherein the CTS system is connected to the CTS user device and the peer device,
wherein the answer assistance system includes a database, which stores a plurality of questions and a plurality of answers,
wherein the answer assistance system is configured to identify the question by identifying a question mark from the caption data, or identifying a question indicator, or analyzing intonation of the peer's voice.

2. CTS system of claim 1, further comprising a voice handler which is connected to the TTS system via a voice path, the CTS user device via the voice path, and the peer device via the voice path, wherein the TTS system transfers the voice of the speech to the voice handler via the voice path, and the voice handler transfers the voice of the speech to the peer device via the voice path.

3. The CTS system of claim 2, wherein the CTS user device comprises a user interface which includes a chat window, a text input field, and an answer suggestion display field,
   wherein the chat window is configured to display the caption data,
   wherein the text input field is configured to display the text data which the CTS user types, and
   wherein the answer suggestion display field is configured display the answer suggestions.

4. CTS system of claim 3, wherein the answer suggestion display field is configured for the CTS user to select an answer from the answer suggestions,
   wherein the CTS user device is configured either to send the answer to the TTS system for being converted into a speech, whose voice is transferred to the peer device, to display the answer in the text input field so that the CTS user can edit the answer and send the edited answer to the TTS system for being converted into a speech whose voice is transferred to the peer device.

5. The CTS system of claim 3, wherein the answer assistance system is configured to receive an answer to the question from the CTS user device.

6. The CTS system of claim 3, wherein the TTS system is configured to check a progress of the speech and send the progress of the speech to the CTS user device,
   wherein the CTS user device is configured to display the progress of the speech by animating the text data or displaying a speech progress bar.

7. The CTS system of claim 1, wherein the answer assistance system is configured to analyze the CTS user's previous answers, contacts, email, text, internet search, and social network account in order to generate the answer suggestions.

8. The CTS system of claim 1, wherein the CTS system is configured to identify spoken language of the CTS user.

9. The CTS system of claim 1, wherein the TTS system includes a plurality of voices to generate the speech, where in the TTS system is configured to receive an audio sample of the CTS User from the CTS user device, compare the audio sample to the voices, and find a voice closest to the audio sample so that the voice can be used to generate the speech.

10. The CTS system of claim 9, wherein the TTS system is configured to receive a plurality of audio samples of the CTS user from the CTS user device and analyze them to customize the voice for making the voice close to a voice of the CTS user.

11. The CTS system of claim 1, wherein the TTS system is configured to analyze a speed of the CTS user's speech and adjust a speed of the speech similar to the speed of the CTS user's speech.

12. A system for providing captions to a CTS user during a phone call between the CTS user and a peer, comprising:
   a CTS system having a captioner and a TTS system; and
   a CTS user device having an answer assistance system, wherein the captioner receives the peer's voice from a peer device, transcribes the peer's voice into a caption data, and transfers the caption data to a CTS user device, wherein the TTS system is configured to receive a text data from the CTS user device, convert the text data into a speech, and transfer a voice of the speech to the peer device, wherein the answer assistance system is configured to receive the caption data from the captioner, analyze the caption data to identify a question, analyze the question to generate answer suggestions, and forward the answer suggestions to the CTS user device, wherein the CTS system is connected to the CTS user device and the peer device, wherein the answer assistance system includes a database, which stores a plurality of questions and a plurality of answers, wherein the answer assistance system is configured to identify the question by identifying a question mark from the caption data, or identifying a question indicator, or analyzing intonation of the peer's voice.

13. The system of claim 12, wherein the CTS system further comprises a voice handler which is connected to the TTS system via a voice path, the CTS user device via the voice path, and the peer device via the voice path, wherein the TTS system transfers the voice of the speech to the voice handler via the voice path, and the voice handler transfers the voice of the speech to the peer device via the voice path.

14. The system of claim 13, wherein the CTS user device comprises a user interface which includes a chat window, a text input field, and an answer suggestion display field,
  wherein the chat window is configured to display the caption data,
  wherein the text input field is configured to display text data which the CTS user types, and
  wherein the answer suggestion display field is configured to display the answer suggestions.

15. The system of claim 14, wherein the answer suggestion display field is configured for the CTS user to select an answer from the answer suggestions,
  wherein the CTS user device is configured either to send the answer to the TTS system for being converted into a speech, whose voice is transferred to the peer device, or to display the answer in the text input field so that the CTS user can edit the answer and send the edited answer to the TTS system for being converted into a speech whose voice is transferred to the peer device.

16. A system for providing captions to a CTS user during a phone call between the CTS user and a peer, comprising:
  a CTS system having a captioner and a voice handler;
  a text-to-speech (TTS) system; and
  a CTS user device,
wherein the captioner is configured to receive the peel's voice from a peer device, transcribe the peer's voice into a caption data, and transfer the caption data to a CTS user device, wherein the voice handler is connected to the CTS user device via a voice path and the peer device via the voice path, wherein the Voice handler receives a voice of the CTS user via the voice path and transfers the voice of the CTS user to the Peer device via the voice path, wherein the TTS system is configured to receive a text data from the CTS user device, convert the text data into a speech, and transfer a voice of the speech to the peer device, wherein the TTS system is connected to the voice handler via the voice path and receives the text data from the CTS user device via a data path, and wherein the TTS system transfers the speech to the voice handler via the voice path and the voice handler transfers the speech to the peer device via the voice path, wherein the system further comprises an answer assistance system which is configured to receive the caption data from the captioner, analyze the caption data to identify a question, analyze the question to generate answer suggestions, and forward the answer suggestions to the CTS User device, wherein the answer assistance system includes a database, which stores a plurality of questions and a plurality of answers, wherein the answer assistance system is configured to identify the question by identifying a question mark from the caption data, or identifying a question indicator, or analyzing intonation of the peer's voice.

17. The system of claim 16, wherein the CTS user device comprises a user interface which includes a chat window, a text input field, and an answer suggestion display field,
  wherein the chat window is configured to display the caption data,
  wherein the text input field is configured to display the text data which the CTS user types, and
  wherein the answer suggestion display field is configured to display the answer suggestions.

18. The system of claim 17, wherein the answer suggestion display field is configured for the CTS user to select an answer from the answer suggestions,
  wherein the CTS user device is configured either to send the answer to the TTS system for being converted into a speech, whose voice is transferred to the peer device, or to display the answer in the text input field so that the CTS user can edit the answer and send the edited answer to the TTS system for being converted into a speech whose voice is transferred to t peer device.

19. The CTS system of claim 16, wherein the answer assistance system is configured to analyze the CTS user's previous answers, contacts, email, text, internet search, and social network account in order to generate the answer suggestions.

* * * * *